(12) United States Patent
Yang et al.

(10) Patent No.: US 9,603,082 B2
(45) Date of Patent: Mar. 21, 2017

(54) FEEDBACK METHOD FOR ACTIVE SCANNING OF USER TERMINAL, AND ACCESS POINT

(71) Applicant: Huawei Technologies Co., Ltd., Shenzhen, Guangdong (CN)

(72) Inventors: Guorui Yang, Shenzhen (CN); Zongming Yao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 14/327,427

(22) Filed: Jul. 9, 2014

(65) Prior Publication Data

US 2014/0355589 A1    Dec. 4, 2014

Related U.S. Application Data

(63) Continuation of application No. PCT/CN2013/070024, filed on Jan. 4, 2013.

(30) Foreign Application Priority Data

Jan. 9, 2012  (CN) .......................... 2012 1 0004700
Jan. 9, 2012  (CN) .......................... 2012 1 0143250

(51) Int. Cl.
*H04W 48/14*    (2009.01)
*H04W 48/16*    (2009.01)

(52) U.S. Cl.
CPC ............ *H04W 48/14* (2013.01); *H04W 48/16* (2013.01)

(58) Field of Classification Search
CPC ............................... H04W 48/14; H04W 48/16
See application file for complete search history.

(56) References Cited

U.S. PATENT DOCUMENTS

2005/0078708 A1* 4/2005 Bender ............... H04L 49/3009
                                                      370/475
2005/0207399 A1* 9/2005 Spitzer ............. H04L 29/06027
                                                      370/352

(Continued)

FOREIGN PATENT DOCUMENTS

CN    101123802 A    2/2008
CN    101150839 A    3/2008

(Continued)

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications", IWWW Draft P802.11-REVmb/D12, Nov. 2011, 2910 pages.

(Continued)

*Primary Examiner* — Jenee Williams

(57) ABSTRACT

Embodiments of the present invention provide a feedback method for active scanning of a user terminal and an access point, and relate to the field of communications, where a timer is set in the access point, and after the timer reaches preset time, buffered probe response message can be cleared, thereby further reducing an overhead of channel resources. The feedback method includes: receiving a probe request message from a user terminal, where the probe request message includes scanning time preset by the user terminal; generating and buffering a probe response message of the probe request message; setting and starting a timer corresponding to the user terminal according to the received scanning time preset by the user terminal; and clearing the buffered probe response message after determining that the (Continued)

timer reaches the preset scanning time and the probe response message is not sent to the user terminal.

10 Claims, 2 Drawing Sheets

(56) References Cited

U.S. PATENT DOCUMENTS

| | | |
|---|---|---|
| 2006/0089138 A1 | 4/2006 | Smith et al. |
| 2007/0050523 A1 | 3/2007 | Emeott et al. |
| 2007/0237121 A1 | 10/2007 | Khandelwal et al. |
| 2008/0123558 A1* | 5/2008 | Chhabra ........... H04L 29/12311 370/254 |
| 2009/0022068 A1* | 1/2009 | Iyer ................... H04L 41/0806 370/254 |
| 2009/0135769 A1* | 5/2009 | Sambhwani ......... H04L 5/0053 370/329 |
| 2010/0008285 A1 | 1/2010 | Kuroda |
| 2010/0027519 A1* | 2/2010 | Chen .................... H04W 24/00 370/338 |
| 2010/0054154 A1* | 3/2010 | Lambert ........... H04L 29/12311 370/254 |
| 2010/0189012 A1* | 7/2010 | Shibuya ................ H04W 76/02 370/254 |
| 2012/0004004 A1* | 1/2012 | Song .................... H04W 48/20 455/515 |
| 2012/0307663 A1 | 12/2012 | Kwak |
| 2013/0155933 A1* | 6/2013 | Kneckt ............... H04W 74/002 370/312 |

FOREIGN PATENT DOCUMENTS

| | | |
|---|---|---|
| CN | 101390344 A | 3/2009 |
| CN | 101444130 A | 5/2009 |
| CN | 101483894 A | 7/2009 |
| CN | 101527923 A | 9/2009 |
| CN | 101730158 A | 6/2010 |

OTHER PUBLICATIONS

Tom Siep, et al., "Specification Framework for TGai", IEEE P802.11 Wireless LANs, Jan. 2011, 9 pages.

* cited by examiner

FEEDBACK METHOD FOR ACTIVE SCANNING OF USER TERMINAL, AND ACCESS POINT

CROSS-REFERENCE TO RELATED APPLICATIONS

This application is a continuation of International Application No. PCT/CN2013/070024, filed on Jan. 4, 2013, which claims priority to Chinese Patent Application No. 201210004700.9, filed on Jan. 9, 2012 and Chinese Patent Application No. 201210143250.1, filed on Jan. 9, 2012, all of which are hereby incorporated by reference in their entireties.

TECHNICAL FIELD

The present invention relates to the field of communications, and in particular, to a feedback method for active scanning of a user terminal, and an access point.

BACKGROUND

In a wireless local area network (Wireless Local Area Networks, WLAN), a basic service set (Basic Service Set, BSS) is a basic component part of the wireless local area network. When a user terminal needs to access a basic service set network, the user terminal needs to discover, through scanning, the basic service set network and an access point (Access Point, AP) of the basic service set network. Scanning methods are classified into two modes: active scanning and passive scanning, where when the user terminal is in an active scanning mode, the user terminal sends a probe request message to the access point through unicast or broadcast on a channel, and then waits for corresponding probe response message sent by the access point within a certain period of time. In this manner, the user terminal actively discovers a basic service set network and acquires an associated attribute of the basic service set network. The probe request message sent by the user terminal includes a service set identifier (Service Set Identifier, SSID) and a basic service set identifier (Basic Service Set Identifier, BSSID). After receiving the probe request message, the access point feeds back a corresponding probe response message to the user terminal if the following conditions are satisfied: The SSID is a wildcard SSID or matches an SSID of an extended service set (Extended Service Set, ESS), and the BSSID is a wildcard BSSID or a BSSID of the access point.

However, in the prior art, when the access point feeds back the probe response message to the user terminal, the access point does not send the probe response message to the user terminal immediately, but arranges the probe response message in a transmission queue, and then acquires a message sending opportunity in a distributed competition manner. However, time during which the user terminal waits for a response is fixed. After the user terminal ends scanning of this channel, the access point may still continuously send the probe response message to the user terminal because the access point does not know that the user has left, which leads to a waste of channel resources.

SUMMARY

Embodiments of the present invention provide a feedback method for active scanning of a user terminal, and an access point, where a timer is set in the access point, and after the timer reaches preset time, buffered probe response message can be cleared, thereby further reducing an overhead of channel resources.

In order to achieve the foregoing objectives, the following technical solutions are adopted in the embodiments of the present invention.

In an aspect, an embodiment of the present invention provides a feedback method for active scanning of a user terminal, where the method includes:

receiving a probe request message from a user terminal, where the probe request message includes scanning time preset by the user terminal;

generating and buffering a probe response message of the probe request message;

setting and starting a timer corresponding to the user terminal according to the received scanning time preset by the user terminal; and clearing the buffered probe response message after determining that the timer reaches the preset scanning time and the probe response message is not sent to the user terminal.

In an aspect, an embodiment of the present invention provides an access point, including:

a receiver, configured to receive a probe request message from a user terminal, where the probe request message includes scanning time preset by the user terminal;

a buffer, configured to generate and buffer a probe response message of the probe request message;

a timer setting unit, configured to set and start a timer corresponding to the user terminal according to the received scanning time preset by the user terminal; and a processor, configured to clear the buffered probe response message after determining that the timer reaches the preset scanning time and the probe response message is not sent to the user terminal.

In the feedback method for active scanning of a user terminal and the access point provided by the embodiments of the present invention, a probe request message which is from a user terminal and includes scanning time preset by the user terminal is received, a probe response message of the probe request message is generated and buffered, and meanwhile, a timer corresponding to the user terminal is set and started according to the scanning time preset by the user terminal, and the buffered probe response message is cleared after it is determined that the timer reaches the preset scanning time and the probe response message is not sent to the user terminal. Through the solution, the access point can set the timer corresponding to the user terminal, and after the timer reaches preset time, cancel transmission of the probe response message to the user terminal and clear buffered probe response message, thereby further reducing an overhead of channel resources.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to these accompanying drawings without creative efforts.

DETAILED DESCRIPTION

Figure 1:
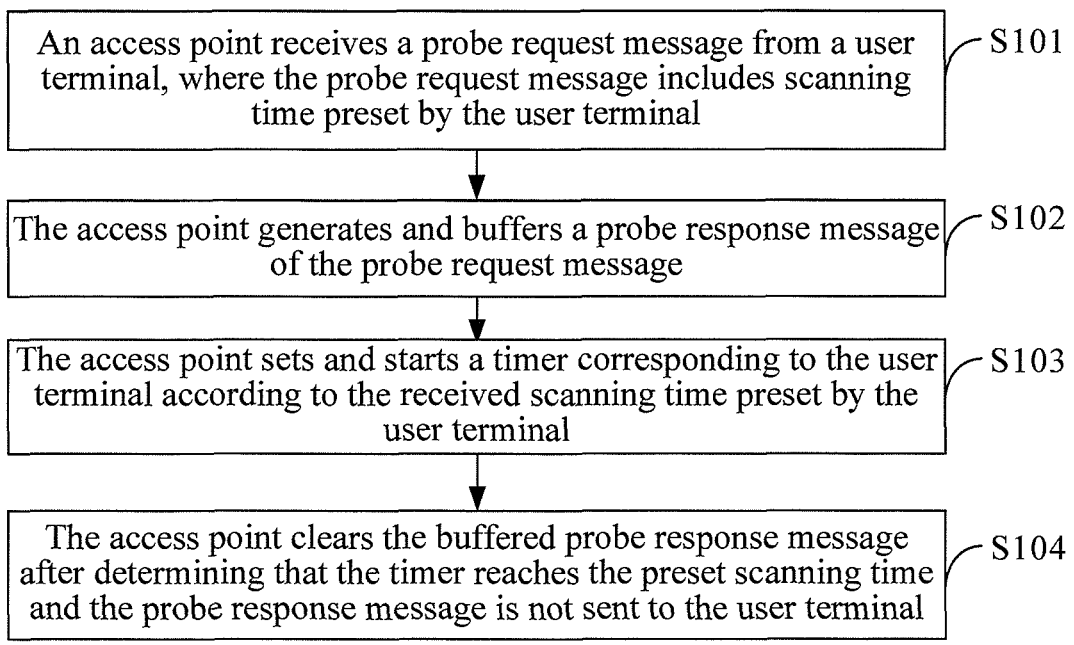
FIG. 1 is a first schematic flow chart of a feedback method for active scanning of a user terminal according to an embodiment of the present invention.

In order to describe but not to limit the present invention, the following description provides specific details such as a specific system structure, interface, technology, so as to facilitate thorough understanding of the present invention. However, persons skilled in the art should understand that the present invention may also be implemented in other embodiments without these specific details. In other situations, detailed description of well-known apparatuses, circuits, and methods is omitted, so that the description of the present invention is not affected by unnecessary details.

All kinds of technologies described in this document may be applied to various types of wireless communication systems, for example, current 2G and 3G communication systems and next generation communication systems, for example, a global system for mobile communications, a code division multiple access system, a time division multiple access system, wideband code division multiple access, a frequency division multiple access system, an orthogonal frequency division multiple access system, a single carrier system, a general packet radio service system, a long term evolution system, and other communication systems of this type.

All aspects are described in this document in combination with a terminal and/or a base station and/or a base station controller.

A user equipment may be a wireless terminal and may also be a wired terminal. The wireless terminal may be an equipment for providing voice and/or data connectivity for a user, a handheld equipment having a wireless connection function, or another processing equipment connected to a wireless modem. The wireless terminal may communicate with one or more core networks via a wireless access network. The wireless terminal may be a mobile terminal, for example, a mobile phone (alternatively referred to as a "cellular" phone), or a computer having a mobile terminal, for example, a portable, pocket, handheld, computer-built, or vehicle-mounted mobile apparatus, which exchanges voice and/or data with the wireless access network. For example, the wireless terminal may be an equipment such as a personal communication service phone, a cordless phone, a session initiation protocol phone set, a wireless local loop station, and a personal digital assistant. The wireless terminal may also be referred to as a system, a subscriber unit, a subscriber station, a mobile station, a mobile station, a remote station, an access point, a remote terminal, an access terminal, a user terminal, a user agent, a user equipment, or a user installation.

The base station (for example, an access point) may refer to an equipment communicating with a wireless terminal via one or more sectors at an air interface in an access network. The base station may be configured to perform mutual conversion on a received air frame and an IP packet, and serve as a router between the wireless terminal and a rest part of the access network, where the rest part of the access network may include an Internet protocol (IP) network. The base station may also coordinate attribute management of the air interface.

Further, the terms "system" and "network" in this document can always be exchanged for use in this document. The term "and/or" in this document is only an association relationship for describing associated objects, and represents that three relationships may exist, for example, A and/or B may represent the following three cases: A exists alone, both A and B exist, and B exists alone. In addition, the character "/" in this document usually represents that the former and later associated objects are in a "or" relationship.

An embodiment of the present invention provides a feedback method for active scanning of a user terminal. As shown in FIG. 1, the method includes:

S101: An access point receives a probe request message from a user terminal, where the probe request message includes scanning time preset by the user terminal.

In a WLAN, a BSS is a basic component part of the wireless local area network. When a user terminal needs to access a basic service set network, the user terminal first needs to discover the basic service set network and a corresponding access point of the basic service set network through a scanning mechanism. This scenario is referred to as AP detection. When the user terminal enables the AP detection, the user terminal first generates a scanning request primitive at a management entity (Station Management Entity, SME). An MAC layer management entity (MAC Layer Management Entity, MLME) receives the scanning request primitive, and then determines a scanning mode and scanned content according to indication information of the scanning request primitive, for example, active scanning or passive scanning of the user terminal, a scanning channel list of the user terminal, maximum and minimum channel scanning time, and the like. Further, if the scanning mode is set to an active mode, the MLME of the user terminal sends the probe request message on a channel determined by the primitive, and starts to detect an access point AP working on the channel. If a working access point exists on the channel, the access point receives the probe request message from the user terminal. The probe request message may include channel scanning time information of the user terminal. Specifically, the channel scanning time indicates remaining channel scanning time of the user terminal, which may be the maximum channel scanning time indicated in the scanning request primitive. The probe request message may also include an SSID and a BSSID.

Exemplarily, the scanning time preset by the user terminal may be set in an information element (Information Element, IE) of the probe request message, or, the scanning time preset by the user terminal may also be set in a time domain field of the probe request message.

S102: The access point generates and buffers a probe response message of the probe request message.

The access point needs to perform determination on the probe request message after receiving the probe request message from the user terminal, and specifically, may determine the SSID, the BSSID, and the like of the probe request message. If the SSID is a wildcard SSID or matches an SSID of an ESS, and the BSSID is a wildcard BSSID or a BSSID of the access point, the access point may generate a probe response message corresponding to the probe request message, and arrange the probe response message in a transmission queue to wait for being sent. Exemplarily, the probe response message may be a unicast or multicast probe response message.

When determining that a response condition is satisfied, the access point may start a timer corresponding to the user terminal. The timer may be set according to the scanning time carried in the probe request message.

S103: The access point sets and starts a timer corresponding to the user terminal according to the received scanning time preset by the user terminal.

The access point sets and starts the timer corresponding to the user terminal according to the scanning time preset by the user terminal in the probe response message when generating and buffering the probe response message of the probe request message. Specifically, a user terminal identifier may be used to set the timer corresponding to the user terminal. Further, the user terminal identifier may be an MAC (Medium/Media Access Control, medium access control) address, and the timer may be a probe response timer.

S104: The access point clears the buffered probe response message after determining that the timer reaches the preset scanning time and the probe response message is not sent to the user terminal.

When the timer starts timing, the access point may clear the buffered probe response message after determining that the timer reaches the preset scanning time and the buffered probe response message is not sent to the user terminal.

Exemplarily, multiple timing manners of the timer may exist. An initial value of the timer may be set to zero, and a count-up manner is adopted. After a timing value of the timer reaches the scanning time preset by the user terminal and the probe response message is not sent to the user terminal, the buffered probe response message is cleared. An initial value of the timer may also be set to the scanning time preset by the user terminal, and a count-down manner is adopted. When a timing value of the timer is exhausted, that is, when the timing value is zero, and the probe response message is not sent to the user terminal, the buffered probe response message is cleared.

In the feedback method for active scanning of a user terminal provided by the embodiment of the present invention, a probe request message which is from a user terminal and includes scanning time preset by the user terminal is received, a probe response message of the probe request message is generated and buffered, and meanwhile, a timer corresponding to the user terminal is set and started according to the scanning time preset by the user terminal, and the buffered probe response message is cleared after it is determined that the timer reaches the preset scanning time and the probe response message is not sent to the user terminal. Through the solution, the access point can set the timer corresponding to the user terminal, and after the timer reaches preset time, cancel transmission of the probe response message to the user terminal and clear buffered probe response message, thereby further reducing an overhead of channel resources.

Figure 2:
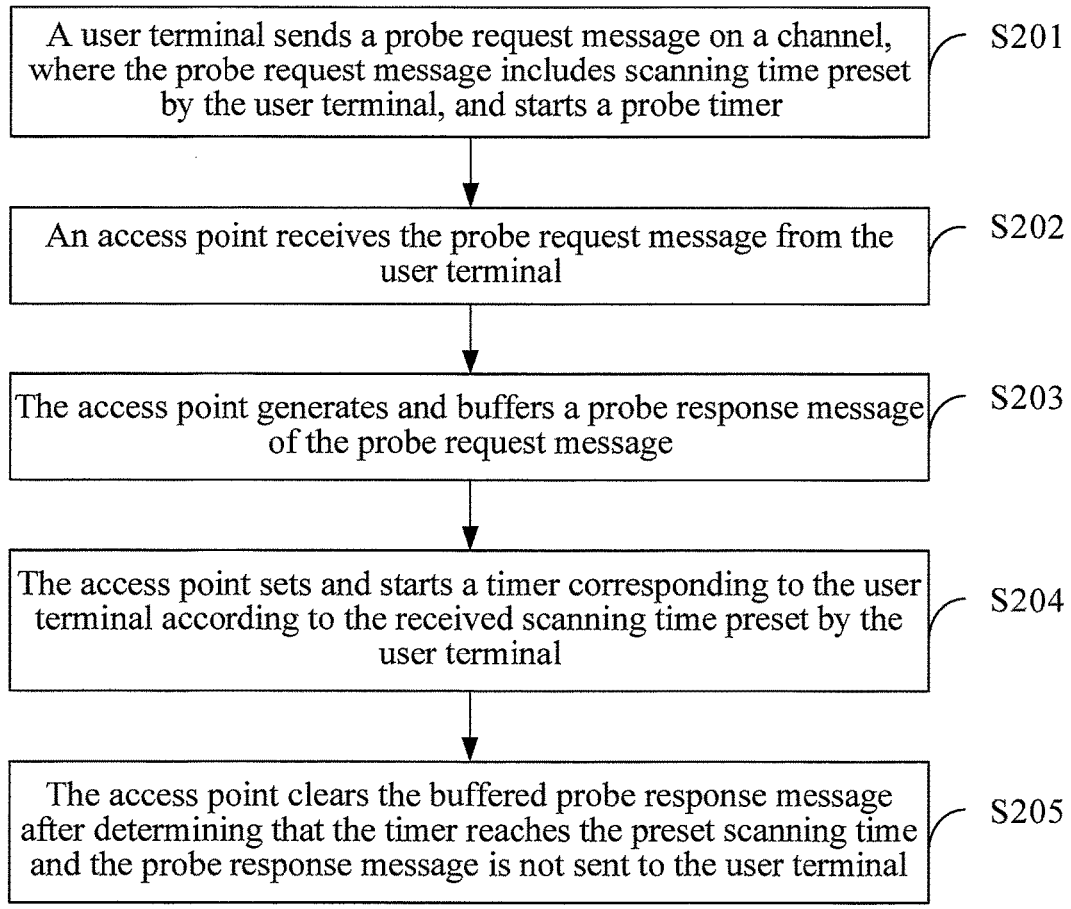
FIG. 2 is a second schematic flow chart of a feedback method for active scanning of a user terminal according to an embodiment of the present invention.

An embodiment of the present invention provides a feedback method for active scanning of a user terminal. As shown in FIG. 2, the method includes:

S201: A user terminal sends a probe request message on a channel, where the probe request message includes scanning time preset by the user terminal, and starts a probe timer.

The scanning time preset by the user terminal and included in the probe request message sent by the user terminal may be used to indicate maximum time of scanning of the user terminal on the channel. The preset scanning time may be, but is not limited to, maximum channel scanning time, and may also be time preset by the user terminal. The preset scanning time may be indicated in an information element of the probe request message, and may also be indicated in a time domain/ID field of an MAC frame header of the probe request message, where a location of the preset scanning time is not limited.

It should be supplemented that, when the user terminal scans the channel, a physical layer of the user terminal may listen to the channel, and if a message sent by another station occurs on the channel, generates a channel-busy primitive. After the user terminal starts the probe timer, when a timing value of the probe timer reaches minimum channel scanning time, if the physical layer of the user terminal does not generate a channel-busy primitive, which means that no working access point exists on the channel, the user terminal ends scanning of the channel; if the physical layer of the user terminal generates a channel-busy primitive, the user terminal continuously scans the channel.

S202: An access point receives the probe request message from the user terminal.

It should be supplemented that, the probe request message of the user terminal may not only include the scanning time preset by the user terminal, but also include an SSID and a BSSID.

The SSID is a service set identifier. Through an SSID technology, one wireless local area network may be divided into several subnetworks which require different identity authentication. Each subnetwork requires independent identity authentication. Only a user terminal succeeding in identity authentication can access a corresponding subnetwork, thereby preventing an unauthorized user from accessing the network. The BSSID is a basic service set identifier and refers to that an MAC address of the user terminal, at one access point and at one basic architecture mode BSS, is defined in the wireless local area network specification. Each BSS is uniquely defined in this area.

S203: The access point generates and buffers a probe response message of the probe request message.

The access point may perform determination on the probe request message after receiving the probe request message from the user terminal, and specifically, may determine the SSID and the BSSID of the probe request message. If the SSID is a wildcard SSID or the SSID matches an SSID of an ESS, and the BSSID is a wildcard BSSID or the BSSID is a BSSID of the access point, the access point generates the probe response message of the probe request message, and buffers the probe response message. A specific buffering form may be arrangement in a transmission queue. Exemplarily, the probe response message is a unicast or multicast probe response message.

S204: The access point sets and starts a timer corresponding to the user terminal according to the received scanning time preset by the user terminal.

The access point sets and starts the timer corresponding to the user terminal according to the scanning time preset by the user terminal in the probe response message when generating and buffering the probe response message of the probe request message. Specifically, a user terminal identifier may be used to set the timer corresponding to the user terminal. Further, the user terminal identifier may be an MAC address.

S205: The access point clears the buffered probe response message after determining that the timer reaches the preset scanning time and the probe response message is not sent to the user terminal.

The access point follows a distributed competition mechanism to send the probe response message in the transmission queue till the timer reaches the scanning time preset by the user terminal. The timer starts timing. If the timer does not reach the preset scanning time, the probe response message buffered in the transmission queue waits for being sent to the user terminal. If the access point determines that the timer reaches the preset scanning time and the buffered probe response message is not sent to the user terminal yet, the access point cancels sending of the probe response message to the user terminal and clears the buffered probe response message.

When the probe timer of the user terminal reaches the preset scanning time, where the scanning time may be the maximum channel scanning time, the user terminal processes the received probe response message and ends the channel scanning.

Exemplarily, multiple timing manners of the timer may exist. An initial value of the timer may be set to zero, and a count-up manner is adopted. After a timing value of the timer reaches the scanning time preset by the user terminal and the probe response message is not sent to the user terminal, the buffered probe response message is cleared. An initial value of the timer may also be set to the scanning time preset by the user terminal, and a count-down manner is adopted. When a timing value of the timer is exhausted, that is, when the timing value is zero, and the probe response message is not sent to the user terminal, the buffered probe response message is cleared.

Similarly, multiple timing manners of the probe timer may exist. An initial value of the probe timer may be set to zero, and a count-up manner is adopted. When a timing value of the probe timer reaches the scanning time preset by the user terminal, the user terminal processes the received probe response message and ends scanning of the channel. An initial value of the probe timer may also be set to the scanning time preset by the user terminal, and a count-down manner is adopted. When a timing value of the probe timer is exhausted, that is, when the timing value is zero, the user terminal processes the received probe response message and ends scanning of the channel.

In the feedback method for active scanning of a user terminal provided by the embodiment of the present invention, a probe request message which is from a user terminal and includes scanning time preset by the user terminal is received, a probe response message of the probe request message is generated and buffered, and meanwhile, a timer corresponding to the user terminal is set and started according to the scanning time preset by the user terminal, and the buffered probe response message is cleared after it is determined that the timer reaches the preset scanning time and the probe response message is not sent to the user terminal. Through the solution, the access point can set the timer corresponding to the user terminal, and after the timer reaches preset time, cancel transmission of the probe response message to the user terminal and clear buffered probe response message, thereby further reducing an overhead of channel resources.

Figure 3:
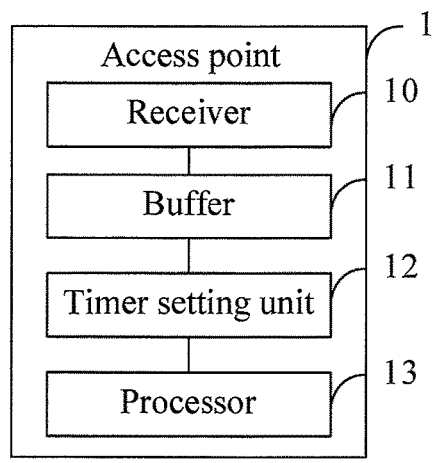
FIG. 3 is an access point according to an embodiment of the present invention.

An embodiment of the present invention provides an access point 1. As shown in FIG. 3, the access point 1 includes:

a receiver 10, configured to receive a probe request message from a user terminal, where the probe request message includes scanning time preset by the user terminal;

a buffer 11, configured to generate and buffer a probe response message of the probe request message;

a timer setting unit 12, configured to set and start a timer corresponding to the user terminal according to the received scanning time preset by the user terminal; and a processor 13, configured to clear the buffered probe response message after determining that the timer reaches the preset scanning time and the probe response message is not sent to the user terminal.

Further, the scanning time preset by the user terminal is maximum channel scanning time.

Further, the scanning time preset by the user terminal is set in an information element of the probe request message, or the scanning time preset by the user terminal is set in a time domain field of the probe request message.

Further, the probe response message is a unicast or multicast probe response message.

Further, the timer setting unit 12 is specifically configured to use a user terminal identifier to set the timer corresponding to the user terminal, set an initial value of the timer to the preset scanning time, and set a timing manner of the timer to a count-down timing manner. Specifically, the user terminal identifier may be an MAC address.

Further, the processor 13 is specifically configured to clear the buffered probe response message after determining that a timing value of the timer is exhausted and the probe response message is not sent to the user terminal.

In the access point provided by the embodiment of the present invention, a probe request message which is from a user terminal and includes scanning time preset by the user terminal is received, a probe response message of the probe request message is generated and buffered, and meanwhile, a timer corresponding to the user terminal is set and started according to the scanning time preset by the user terminal, and the buffered probe response message is cleared after it is determined that the timer reaches the preset scanning time and the probe response message is not sent to the user terminal. Through the solution, the access point can set the timer corresponding to the user terminal, and after the timer reaches preset time, cancel transmission of the probe response message to the user terminal and clear buffered probe response message, thereby further reducing an overhead of channel resources.

Persons skilled in the art may clearly understand that, for the purpose of convenient and brief description, dividing of the foregoing function modules is taken as an example for description, and in actual applications, the foregoing functions may be allocated to different function modules for implementation as required, that is, an inner structure of an apparatus is divided into different function modules to implement all or part of the functions described in the foregoing. For a specific working process of the foregoing system, apparatus and unit, reference may be made to the corresponding process in the foregoing method embodiments, and the details are not repeatedly described herein.

In the several embodiments provided in the present application, it should be understood that the disclosed system, apparatus, and method may be implemented in other manners. For example, the described apparatus embodiment is merely exemplary. For example, the dividing of the modules or units is merely a kind of logical function dividing and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more than two units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be embodied in the form of a software product. The computer software product is stored in a storage medium and includes several instructions for enabling a computer device (which may be a personal computer, a server, or a network device, or the like) or a processor (processor) to perform all or a part of steps of the methods described in the embodiments of the present invention. The foregoing storage medium includes: any medium that is capable of storing program codes, such as a USB flash disk, a removable hard disk, a read-only memory (ROM, Read-Only Memory), a random access memory (RAM, Random Access Memory), a magnetic disk, or an optical disk.

The foregoing description is merely specific implementation manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving a probe request message from a user terminal, wherein the probe request message comprises a scanning time;
   buffering a probe response message in response to the probe request message;
   starting a timer corresponding to the user terminal according to the scanning time, wherein the timer is set by using an identifier of the user terminal, an initial value of the timer is set to the scanning time, and a timing manner of the timer is set to a count-down timing manner; and
   in response to determining that the timer reaches the scanning time, clearing the buffered probe response message that is not sent to the user terminal;
   wherein the timer reaching the scanning time indicates that an elapsed time measured from the end of the reception of the probe request message exceeds the scanning time.

2. The method according to claim 1, wherein the scanning time is maximum channel scanning time.

3. The method according to claim 1, wherein the scanning time is comprised in an information element of the probe request message.

4. The method according to claim 1, wherein the probe response message is a unicast or multicast probe response message.

5. The method according to claim 1, wherein the user terminal identifier is a medium access control (MAC) address.

6. An apparatus, comprising:
   a receiver, configured to receive a probe request message from a user terminal, wherein the probe request message comprises a scanning time;
   a processor, configured to buffer a probe response message received by the receiver in response to the probe request message; and
   a memory coupled to the processor, the memory comprising instructions that, when executed by the processor, cause the apparatus to:
   start a timer corresponding to the user terminal according to the scanning time, wherein the timer is set by using an identifier of the user terminal, an initial value of the timer is set to the scanning time, and a timing manner of the timer is set to a count-down timing manner;
   determine that the timer reaches the scanning time; and
   clear the buffered probe response message that is not sent to the user terminal;
   wherein the timer reaching the scanning time indicates that an elapsed time measured from the end of the reception of the probe request message exceeds the scanning time.

7. The apparatus according to claim 6, wherein the scanning time is maximum channel scanning time.

8. The apparatus according to claim 6, wherein the scanning time is comprised in an information element of the probe request message.

9. The apparatus according to claim 6, wherein the probe response message is a unicast or multicast probe response message.

10. The apparatus according to claim 6, wherein the user terminal identifier is a medium access control (MAC) address.

* * * * *